Nov. 9, 1971   M. BROCHARD   3,618,465
CUTTING DEVICE

Filed Feb. 10, 1970   3 Sheets-Sheet 1

INVENTOR
MICHEL BROCHARD

United States Patent Office 3,618,465
Patented Nov. 9, 1971

3,618,465
CUTTING DEVICE
Michel Brochard, 14 Rue des Reculettes,
75 Paris XIII, France
Filed Feb. 10, 1970, Ser. No. 10,141
Int. Cl. B23c *1/16;* B43l *13/10*
U.S. Cl. 90—13.1                                                6 Claims

ABSTRACT OF THE DISCLOSURE

Apparatus for cutting out sheet material has a follower member for following curves and patterns of the shape to be cut, a principal cutter member positioned to move in a first cutting zone, coupling means linking the principal cutter member to the follower member such that the principal cutter member is constrained to reproduce a shape followed by the follower member, and an auxiliary cutter member positioned to move in a second cutting zone distinct from the first cutting zone, the auxiliary cutter member being controlled by the coupling means such that it is constrained to describe a shape which is similar to the shape described by the principal cutter member, but on a reduced scale.

---

The invention relates to apparatus used, particularly in the clothing industry, to cut pieces out of lengths of raw materials such as cardboard, woven and other cloths, sheets of plastics etc. . . . starting with a tracing, an outline or a pattern, these apparatus comprising a cutting device connected to a curve or pattern-follower by means of a device for reproducing movements.

Before cutting out pieces of material, a process known as laying out is carried out, often on a smaller scale; this consists of finding the most economical layout of the pieces in order to avoid the scrap which is to much raw material wasted. For this purpose, the first thing necessary is to make reproductions of the pieces to be cut out. Hitherto, this work has been done either by hand or with special machines.

The object of the invention is to provide an apparatus for cutting out sheet materials which makes it possible, at the same time as cutting out a pattern for example, to cut out also a similar layout pattern on a small scale.

For this purpose, according to the invention, apparatus for cutting out sheet material, of the above-mentioned type, comprises in addition an auxiliary cutting device working in a different cutting zone from the cutting zone of the main cutting device and governed by the movement-reproducing device so as to trace a geometric figure similar to that traced by the main cutting device, but on a smaller scale.

In this way, e.g. a real pattern and a smaller-scale layout pattern can be cut out simultaneously from a model tracing.

In an advantageous construction, the coupling means for reproducing movements is a pantograph and each cutting tool is a rotary tool mounted on the rotor of a compressed air turbine carried by a vertical pneumatic lowering jack, the turbine and the jack being fed, selectively, from a supply of compressed air, by a suitable valved distributor circuit.

A better understanding of the invention will be gained from reading the following description and studying the attached drawings which show, by way of non-limiting example, a construction of apparatus for cutting out sheet material in accordance with the invention.

Figure 1:
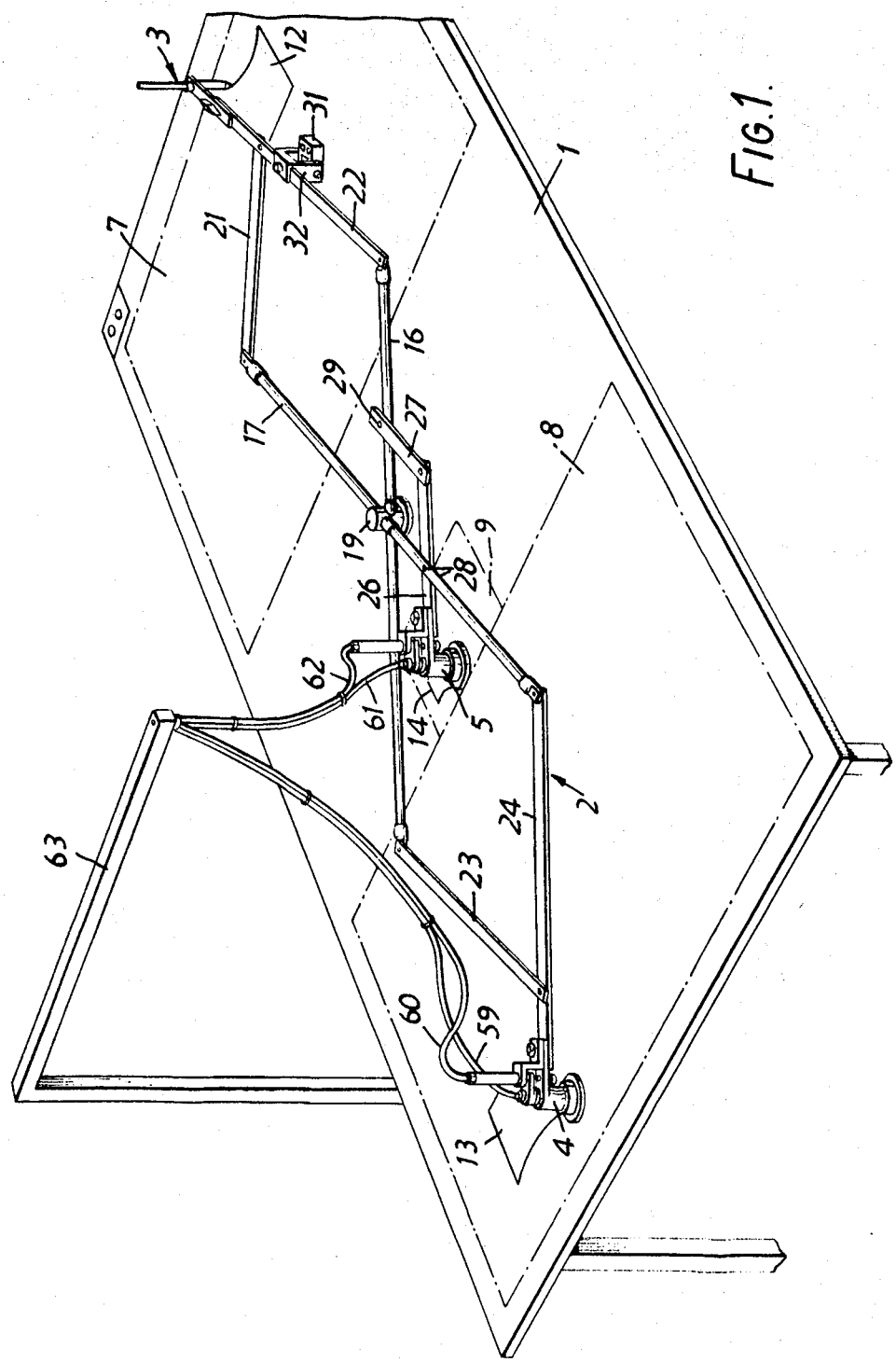
FIG. 1 is a perspective view of the apparatus as a whole.

The apparatus for cutting out sheet material, shown as a whole in FIG. 1, comprises a table 1 and a device for reproducing movements, referenced as a whole under the number 2. This serves to connect a curve-follower 3 and a principal cutting device 4 and an auxiliary cutting device 5.

The table 1 is divided into a curve-following zone 7, a principal cutting zone 8, and an auxiliary cutting zone 9.

The curve-following zone 7 carries for example a model tracing 12, while the pieces to be cut out, such as 13, similar in shape to those in the model tracing 12, are placed on zone 8 and the pieces, such as 14, designed to constitute layout pieces, on a small scale, are placed on zone 9.

The curve-follower 3 consists of a simple point or pencil which the operator causes to follow the outline of the tracing 12 to be reproduced.

The movement-reproducing device 2 is a pantograph having two long legs 16, 17 articulated in the middle on an axis 19 and on the ends of which two small legs 21, 22 and 23, 24 respectively, are articulated, forming articulated rhomboidal structures in conjunction with the corresponding portions of the long legs.

The central axis 19 of the pantograph fixed to the middle of the table 1, while the principal cutting device 4 is carried by the end of the pantograph 2 opposite to the end which carries the curve-follower 3.

The auxiliary cutting device 5 is carried on a leg 26 pivoted to a leg 27, these two legs being respectively pivoted at points 28 and 29 to the legs 17 and 16 of the pantograph so as to form a small articulated rhomboid with the corresponding portions of the legs 16 and 17, so that the auxiliary cutting tool 5 traces geometric curves 14 similar to the model curve 12, but on a smaller scale.

The example illustrated also has at 31, a surface integrator, e.g. a planimeter or surface area meter, of any suitable standard type carried at a point along the leg 22 by a support 32.

Figure 2:
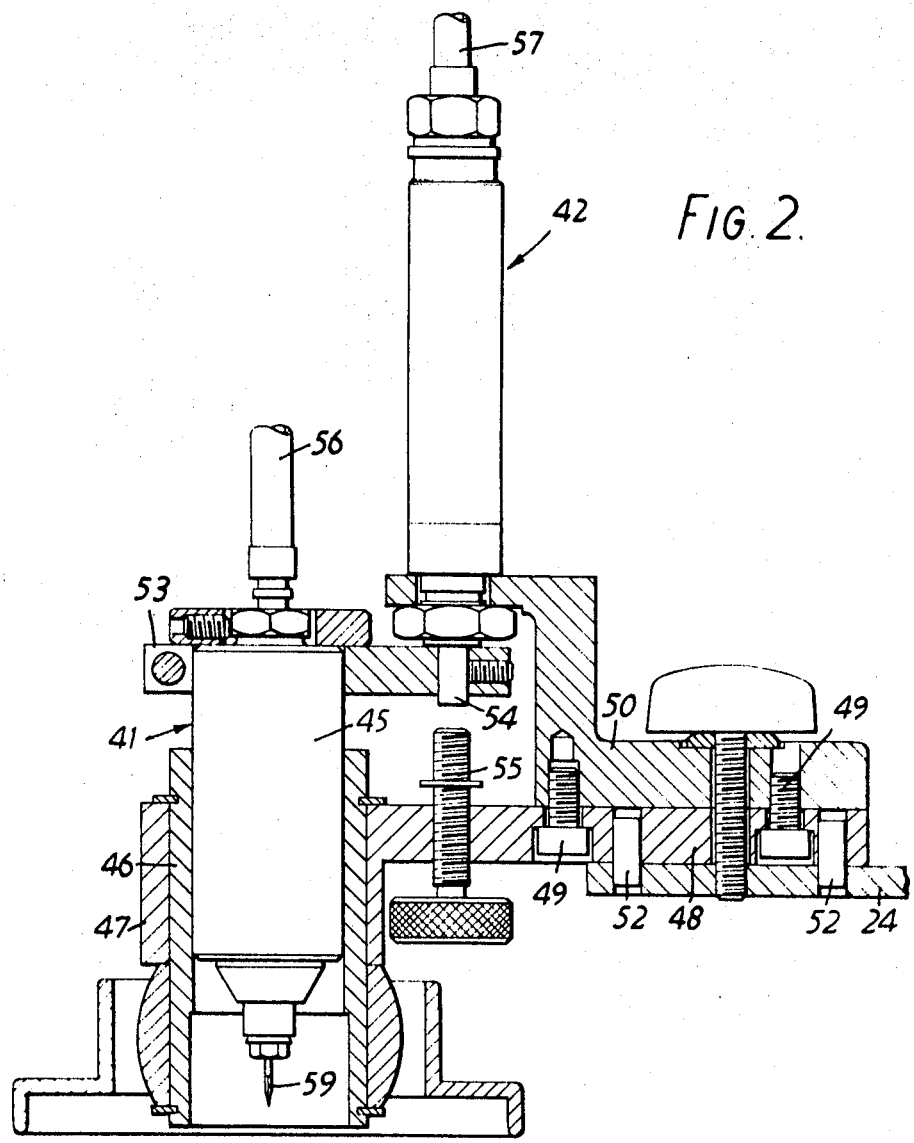
FIG. 2 is a vertical section of a cutter unit.

The two cutting tools 4 and 5 are identical and only one of them will be described, e.g. the principal tool 4, see FIG. 2. This tool unit comprises a cutter unit 41 and a lowering jack 42.

The cutter unit comprises a cylindrical body 45 which can slide vertically in a sleeve 46 carried in a holder 47 formed at the end of an arm 48 which is secured by screws 49 to a bracket 50 carrying the jack 42. The assembly of arm 48 and brack 50 is secured on the free end portion of the leg 24 by means of a hand-screw 51 which engages through bores in the arm 48 and bracket 50 and is threaded into the leg 24. Pins 52 serve to locate the assembly with respect to the leg 24. At its upper end, the cutter 41 is encircled by a clamp 53 which is connected to the piston rod 54 of the jack. The jack is spring-loaded into the raised position, and its piston can be lowered by applying compressed air. The extent of the lowering movement, and thus the depth of cut, can be adjusted by a screw 55. The cutter has an air intake 56, and the jack has an air intake 57. The lower end of the holder 47 carries an annular presser foot 58 adapted to bear on the material during cutting of the sheet material by the milling cutter tool 59 carries on the turbine rotor of the cutter 45. The compressed air escaping from the turbine is trapped by the foot 58 and formed into an air cushion which facilitates movement of the cutter unit over the sheet material.

In FIG. 1, the feed pipe 59 to the turbine and the feed pipe 60 to the jack can be seen. Similarly, the turbine and the jack of the auxiliary cutting device 5 are fed by means of the pipes 61, 62 respectively. All these pipes are supported by a bracket 63 integral with the Table 1.

Figure 3:
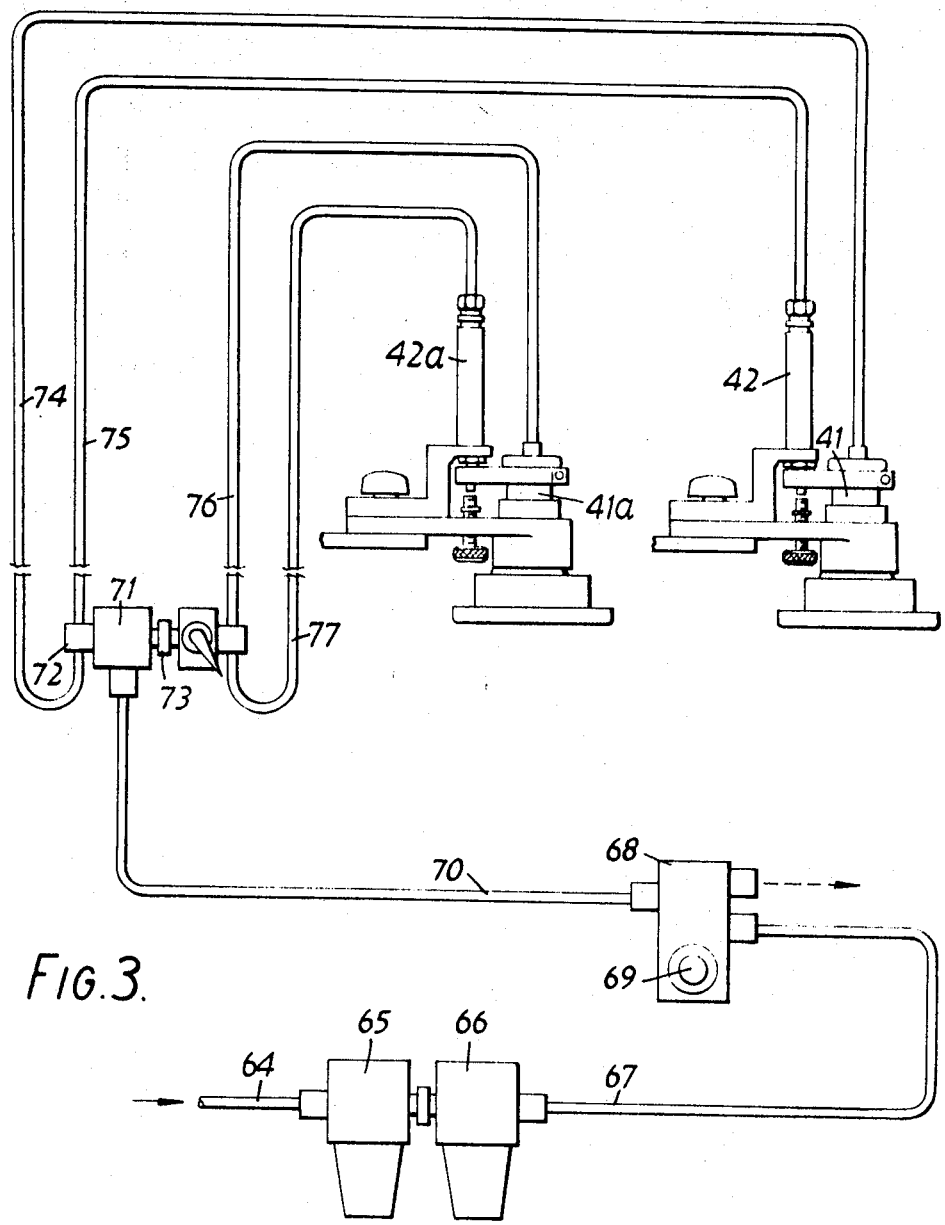
FIG. 3 is a diagram of the compressed air circuit.

Referring to FIG. 3, a compressed air supply is fed in through the pipe 64 to a combined air filter and control valve 65, and from there through an oil-adding unit 66, for the turbine, to a pipe 67 which leads to a main control valve 68 operable by a push-button 69.

From the control valve, a pipe 70 leads to a distribution manifold 71 which has a first outlet 72 for the prinicpal cutter assembly, and a second outlet 73 for the auxiliary cutter assembly. From the outlet 71, a first pipe 74 leads to a turbine 41 of the principal cutter assembly, and a second pipe 75 leads to the jack 42 of the principal cutter assembly. From the outlet 73, a first pipe 76 leads to the turbine 41a of the auxiliary cutter assembly, and a second pipe 77 leads to the jack 42a of the auxiliary cutter assembly. To permit complete isolation of the auxiliary cutter assembly from the air supply, a further valve 78 is interposed between the outlet 73 and the pipes 76 and 77.

The machine as a whole works as follows.

With the model tracing 12 in position on the cutting zone 8 of the table and the piece 14 on the zone 9 for layout pieces, the curve-follower 3 is brought to the required point of departure on the model tracing 12, the push-button 69 is pressed, which feeds compressed air to the two turbines 41, 41a and to the two jack 42, 42a. The two turbines are lowered at the same time as they are rotated. The curve-follower 3 is moved along the model tracing 12, so that the principal cutting tool 4 and the auxiliary cutting tool 5 cut out the pieces 13 and 14, respectively. When cutting is finished, the push-button 69 is released to cut off the air supply, thereby permitting the cutters to lift up away from the material, and the turbines are simultaneously stopped. The push-button valve 68, 69 could be made self-holding in both its "on" and "off" positions until next actuated.

The curve follower could alternatively be a photoelectric follower system with a servo-mechanism to trace the model 12, or an eyepiece with cross-wires.

Following could be done in the form of a predetermined program.

The movement-reproducing device could be quite different in structure from the pantograph structure illustrated.

The cutting tools could be of a different type from the rotary tool type described, e.g. heating tools operating by melting or burning.

The tools could be operated by means other than pneumatic means.

I claim:

1. Apparatus for cutting out pieces of sheet material, comprising a follower member for following curves and patterns of the shape to be cut out, a principal cutter member positioned to move in a first cutting zone, coupling means linking the principal cutter member to the follower member such that the principal cutter member is constrained to reproduce a shape followed by the follower member, and an auxiliary cutter member positioned to move in a second cutting zone distinct from said first cutting zone, said auxiliary cutter being controlled by said coupling means such that said auxiliary cutter member is constrained to describe a shape which is similar to the shape described by said principal cutter member but on a reduced scale.

2. Apparatus, as claimed in claim 1, wherein said coupling means is a pantograph.

3. Apparatus, as claimed in claim 1, comprising a respective compressed air turbine associated with each cutter member and having a stator and a rotor, said cutter member being a milling cutter mounted on said rotor.

4. Apparatus, as claimed in claim 3, comprising a respective support associated with each said turbine, said turbine being mounted in said support in axially shiftable manner, said support having at its lower part means for providing a supporting cushion of air on the sheet material to be cut.

5. Apparatus, as claimed in claim 4, comprising a respective pneumatic lowering jack associated with each said support and including a movable member and a fixed member, said support being mounted on said movable member and said fixed member being mounted on said coupling means.

6. Apparatus as claimed in claim 5, comprising valved distributor means communicating with said turbines and with means for supplying compressed air, said distributor means being arranged selectively to connect said turbines and associated jacks to said compressed air supply means simultaneously, and to disconnect said turbines and associated jacks from said compressed air supply means simultaneously.

References Cited
UNITED STATES PATENTS

| | | | |
|---|---|---|---|
| 2,858,743 | 11/1958 | Sallwey | 90—13.1 |
| 3,211,061 | 10/1965 | Cretsinger | 90—13.1 |

GIL WEIDENFELD, Primary Examiner

U.S. Cl. X.R.

33—25 E